(12) United States Patent
Leon et al.

(10) Patent No.: US 8,402,805 B2
(45) Date of Patent: Mar. 26, 2013

(54) METHOD AND APPARATUS FOR FORMING A CORRUGATED WEB HAVING A CONTINUOUSLY VARYING SHAPE

(75) Inventors: Luis R. Leon, Federal Way, WA (US); Joseph R. Olivadoti, Gig Harbor, WA (US); Garry A. Booker, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 427 days.

(21) Appl. No.: 12/238,389

(22) Filed: Sep. 25, 2008

(65) Prior Publication Data

US 2010/0009126 A1 Jan. 14, 2010

Related U.S. Application Data

(63) Continuation-in-part of application No. 12/172,230, filed on Jul. 12, 2008.

(51) Int. Cl.
*B21D 13/04* (2006.01)
*B21D 13/02* (2006.01)
*B21B 39/00* (2006.01)

(52) U.S. Cl. ............................. 72/379.6; 72/385; 72/226

(58) Field of Classification Search .................. 72/379.6, 72/385, 176–182, 190–198, 226, 234
See application file for complete search history.

(56) References Cited

U.S. PATENT DOCUMENTS

| | | | |
|---|---|---|---|
| 1,311,205 A | 7/1919 | Belcher | |
| 1,469,220 A | 10/1923 | Kemp | |
| 2,241,972 A * | 5/1941 | Wagner | 244/123.12 |
| 2,262,606 A | 11/1941 | Hardman | |
| 2,645,435 A | 7/1953 | Pouit | |
| 2,649,888 A * | 8/1953 | Fay | 72/176 |
| 3,011,602 A | 12/1961 | Ensrud et al. | |
| 3,388,522 A | 6/1968 | Lowes | |
| 3,470,053 A * | 9/1969 | Rule | 72/362 |
| 3,507,634 A | 4/1970 | O'Driscoll | |
| 3,859,832 A * | 1/1975 | Siegwart | 72/180 |
| 4,344,995 A | 8/1982 | Hammer | |
| 4,411,380 A | 10/1983 | McWithey et al. | |
| 4,610,837 A | 9/1986 | Frey | |
| 4,721,593 A | 1/1988 | Kowal | |
| 5,670,238 A | 9/1997 | Earl et al. | |
| 5,735,158 A * | 4/1998 | Brunson | 72/196 |

(Continued)

FOREIGN PATENT DOCUMENTS

| | | |
|---|---|---|
| DE | 2718002 A1 | 10/1978 |
| JP | 11099993 A | 4/1999 |

(Continued)

OTHER PUBLICATIONS

USPTO Office Action, dated May 5, 2011, regarding U.S. Appl. No. 12/172,230, 14 pages.

(Continued)

*Primary Examiner* — Dana Ross
*Assistant Examiner* — Pradeep C Battula
(74) *Attorney, Agent, or Firm* — Yee & Associates, P.C.

(57) ABSTRACT

A method and apparatus are used to form a corrugated web having a cross sectional shape with at least one characteristic that varies substantially continuously along the substantially the entire length of the web. The apparatus includes multiple sets of dies which progressively form corrugations in a moving sheet. At least one characteristic of the web's cross sectional shape is varied along the entire length of the web by displacing the dies as the sheet moves through the die sets.

17 Claims, 15 Drawing Sheets

U.S. PATENT DOCUMENTS

| | | | |
|---|---|---|---|
| 5,848,765 | A | 12/1998 | Gillespie |
| 5,882,462 | A | 3/1999 | Donecker et al. |
| 6,114,050 | A | 9/2000 | Westre et al. |
| 6,599,645 | B2 | 7/2003 | Wittebrood |
| RE38,508 | E | 4/2004 | Wright |
| 6,834,525 | B2 | 12/2004 | Leon et al. |
| 6,848,233 | B1 | 2/2005 | Haszler et al. |
| 7,415,860 | B2 * | 8/2008 | Yamauchi ................... 72/385 |
| 7,566,489 | B2 | 7/2009 | Starke |
| 7,673,832 | B2 | 3/2010 | Meister |
| 7,851,048 | B2 | 12/2010 | Brandon et al. |
| 8,292,227 | B2 | 10/2012 | Stuhr et al. |
| 2004/0093927 | A1 * | 5/2004 | Leon et al. ................... 72/385 |
| 2010/0006700 | A1 | 1/2010 | Stuhr et al. |
| 2010/0193636 | A1 | 8/2010 | De Vita et al. |

FOREIGN PATENT DOCUMENTS

| | | |
|---|---|---|
| WO | PCT US2009/048894 | 10/2009 |
| WO | 2010008922 A1 | 1/2010 |

OTHER PUBLICATIONS

Response to Office Action, dated Aug. 4, 2011, regarding U.S. Appl. No. 12/172,230, 25 pages.

USPTO Final Office Action, dated Nov. 18, 2011, regarding U.S. Appl. No. 12/172,230, 13 pages.

Amendment Pursuant to Request for Continued Examination, dated Feb. 21, 2012, regarding U.S. Appl. No. 12/172,230, 16 pages.

USPTO Notice of Allowance, dated Jul. 5, 2012, regarding U.S. Appl. No. 12/172,230, 11 pages.

* cited by examiner

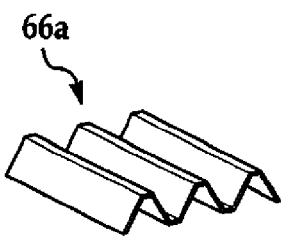
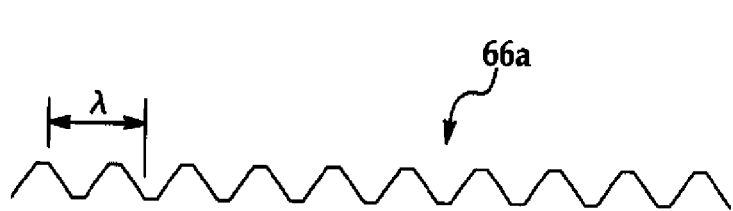
FIG. 7A  FIG. 7B
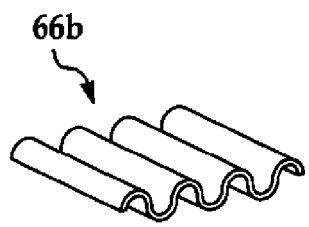
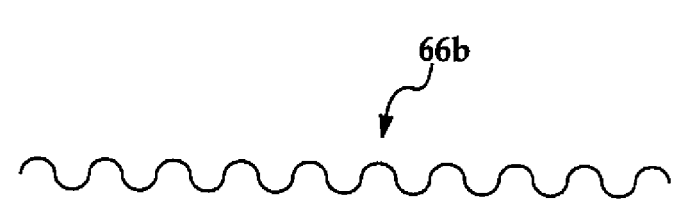
FIG. 8A  FIG. 8B
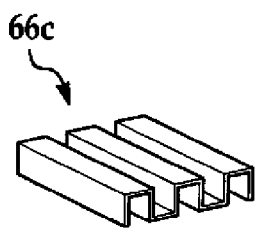
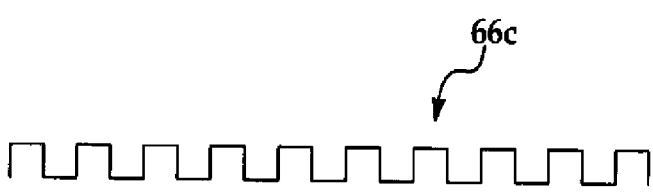
FIG. 9A  FIG. 9B
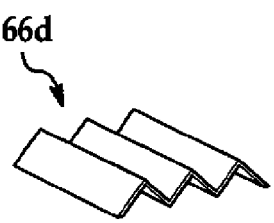
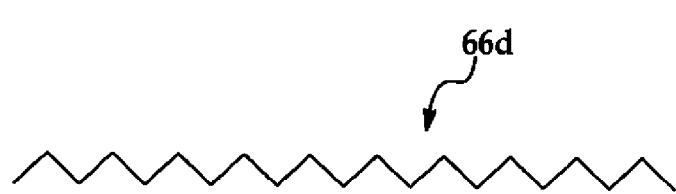
FIG. 10A  FIG. 10B
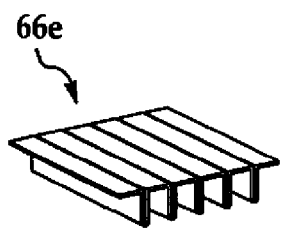
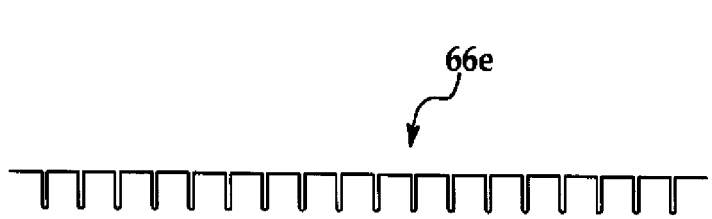
FIG. 11A  FIG. 11B

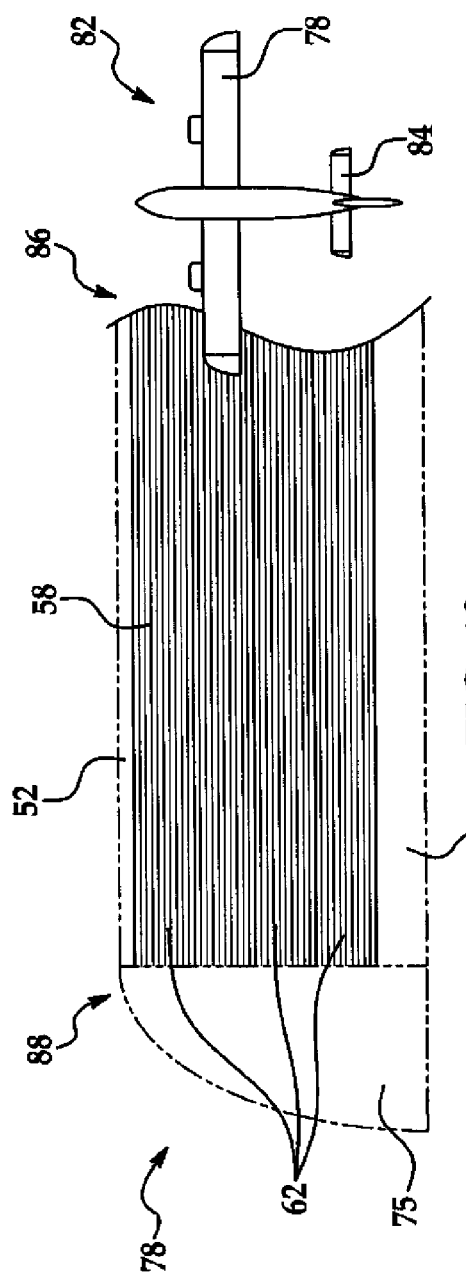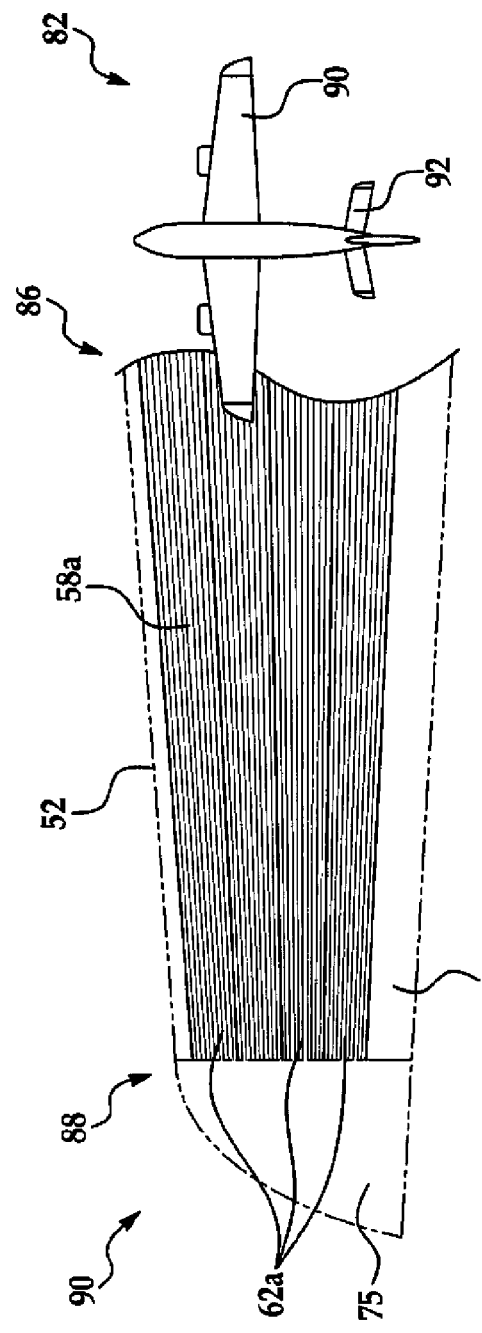

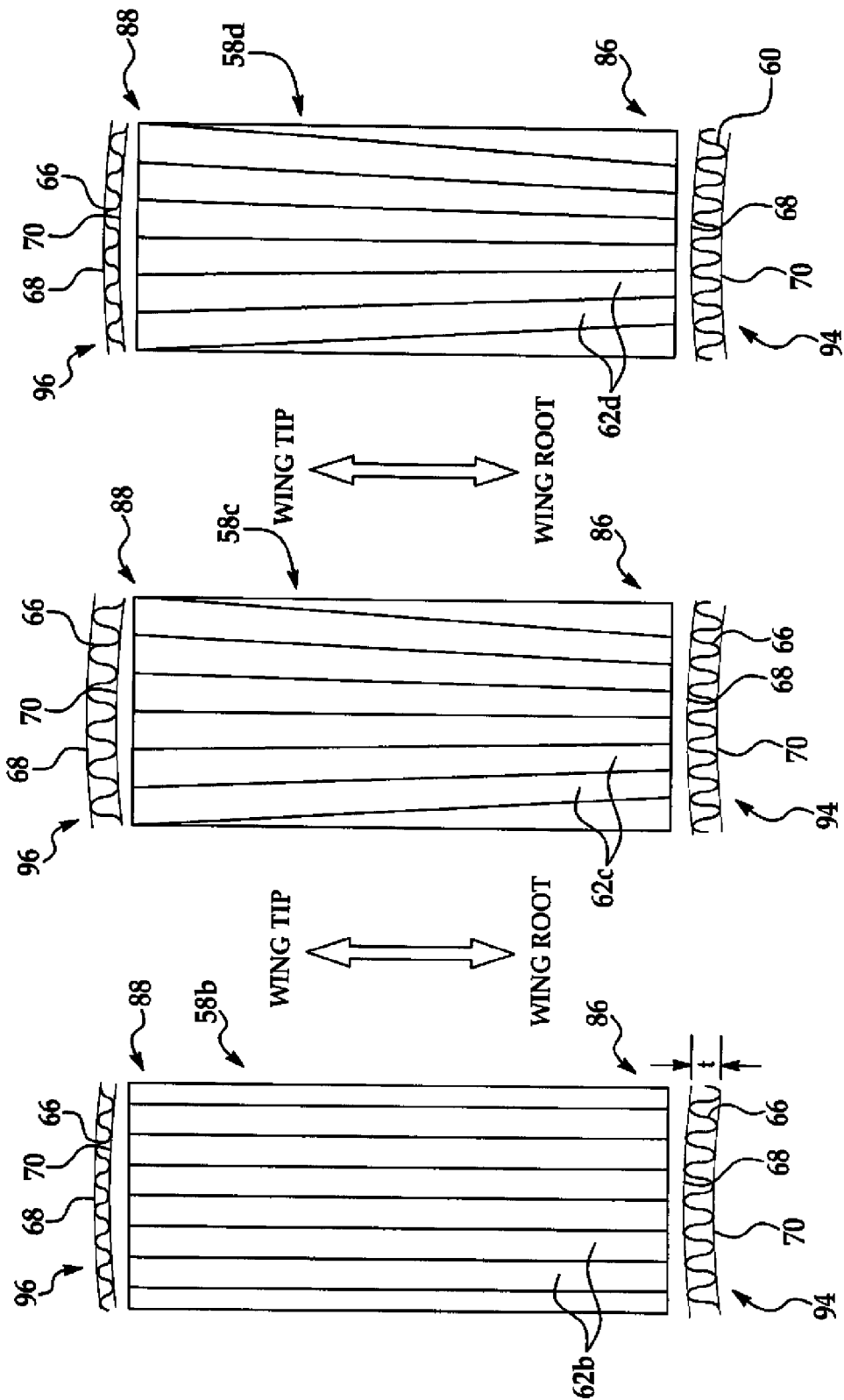

METHOD AND APPARATUS FOR FORMING A CORRUGATED WEB HAVING A CONTINUOUSLY VARYING SHAPE

CROSS REFERENCE TO RELATED APPLICATIONS

This application is a continuation-in-part of U.S. patent application Ser. No. 12/172,230 filed Jul. 12, 2008, the entire disclosure of which is incorporated by reference herein.

TECHNICAL FIELD

This disclosure generally relates to corrugated structural members, especially corrugated webs used as cores to stiffen aircraft wing panels, and deals more particularly with a method and apparatus for forming a corrugated web having a shape that continuously varies along its length.

BACKGROUND

Certain structures used in aircraft, such as, without limitation, wings, horizontal and vertical stabilizers, fins and the like may be formed from panels designed to meet or exceed specified design loads along the length of the panel. In order to tailor the design load along the length of a wing panel, structural features of the panel may be varied from the root to the tip of the wing. For example, in the case of a panel construction having a corrugated web sandwiched between two skins, it may be possible to continuously vary certain characteristics of the corrugated web, such as the thickness, amplitude, or wavelength of the web along its length to achieve the desired load tailoring.

Existing techniques for forming corrugated webs are limited to producing webs having a substantially uniform cross section over the length of the web. A problem therefore exists in forming a corrugated web having a shape that varies continuously along a length sufficient for use in a wing panel Accordingly, there is a need for a method and apparatus for forming corrugated webs having a shape that continuously varies along the length of the web. There is also a need for a method and apparatus for producing such corrugated webs in a substantially continuous process.

SUMMARY

The disclosed embodiments provide a method and apparatus for forming a web having a corrugated cross sectional shape that varies substantially continuously along the length of the web. A continuous process is used to form one-piece plastic or metal corrugated webs of various lengths. The corrugated webs may be used as cores in sandwich-type panel constructions employed in the aircraft industry to form wings, fins, stabilizers and the like. The varying cross sectional shape of the corrugated webs may allow continuous load tailoring of wing panels from root to tip. The embodiments provide real time capability for varying the corrugated dimensions of sheet metal and thermoplastic shapes.

According to one disclosed embodiment, apparatus is provided for forming a corrugated web having a cross sectional shape with at least one characteristic that varies substantially continuously along the length of the web. The apparatus includes: a plurality of die units arranged in sets for progressively forming corrugations in a sheet of material; means for moving the sheet through the sets of die units; and, means for displacing the die units in synchronization with the movement of the sheet. The means for displacing the die units may include mechanisms for simultaneously rotating and moving the die units laterally as the sheet moves through the forming die units.

According to another disclosed embodiment, apparatus is provided for forming a web having corrugations along its length, comprising: means for moving a sheet of material along a first axis; roller dies arranged in sets along the first axis for forming corrugations in the sheets; and, means for synchronously rotating at least certain of the roller dies along a second axis extending transverse to the first axis and for displacing the roller dies along the third axis extending transverse to the first and second axes. The roller dies are spaced apart along the first axis and progressively engage the sheet as the sheet moves along the first axis.

According to a disclosed method embodiment, forming a corrugated web, comprises: moving a sheet of material through a forming station; using multiple sets of dies at the forming station to progressively form corrugations in the sheet as the sheet moves through the forming station; and, changing at least one characteristic of the cross sectional shape of the web by displacing at least certain of the dies as the sheet is moving through the forming station. Progressively forming the corrugations includes using a first set of dies to form the general shape of the corrugations, and using a second set of dies to form the final thickness of the corrugations. Progressively forming the corrugations may further include forming corrugations in a central portion of the sheet and then forming corrugations in the sheet on opposite sides of the central portion. Displacing the dies may include moving the dies laterally away from the centerline of the sheet and rotating the dies in the lateral movement.

According to a further method embodiment, forming a corrugated web comprises: moving a sheet of material along the first axis; forming a set of corrugations in the sheet as the sheet is moving along the first axis by passing the sheet through a set of dies; and varying a characteristic of the cross sectional shape of the web by displacing the dies along a second axis traverse to the first axis as the sheet moves through the set of dies.

The disclosed embodiments satisfy the need for a method and apparatus for forming a web having a cross sectional shape with at least one characteristic that varies substantially continuously along the length of the web. The disclosed embodiments also satisfy the need for aircraft skin panels employing such a web in order to allow load tailoring along the length of the panel.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIGS. 7a-11a are perspective views of alternate embodiments of the web.

FIGS. 7b-11b are end views of the webs respectively shown in FIGS. 7a-11a.

FIG. 12 is a diagrammatic view showing wings and horizontal stabilizers of an airplane in which the panels forming the skin are substantially of uniform width.

FIG. 13 is a view similar to FIG. 12 but showing the use of tapered panels forming a tapered skin.

FIGS. 14-16 illustrate alternate embodiments of wing skin configurations.

DETAILED DESCRIPTION

Figure 1:
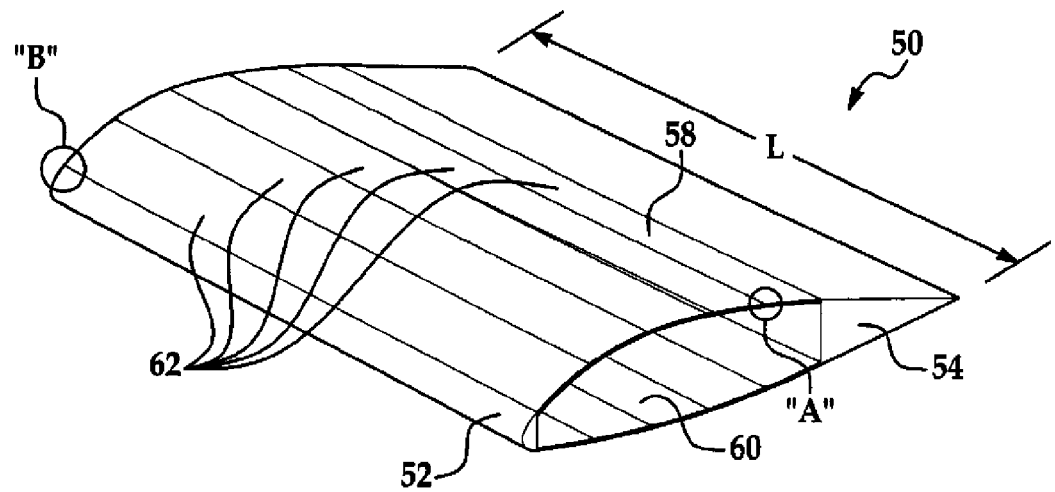
FIG. 1 is a perspective view of a section of a wing having substantially continuously varying structural strength along its length.

Referring first to FIGS. 1-6, a structure such as an aircraft wing section 50 has structural strength or stiffness that varies substantially along its length "L", so as to closely match design loads for the wing. The length L may comprise the entire length of a wing (not shown) or only a portion of the wing length. For example, the structural strength of a wing section 50 may vary continuously from root to tip, interrupted only by load features of the wing such as engine struts.

The wing section 50 may include leading edge structure 52 and trailing edge structure 54 formed in a conventional manner. The leading edge and trailing edge structures 52, 54 are connected by upper and lower wing skins 58, 60 respectively comprising a plurality of elongate skin panels 62 joined together along their edges. The upper and lower skins 58, 60 form a region of use 64 in which the skins 58, 60 provide structural strength or stiffness that varies substantially continuously along the length of the wing section 50 and is closely matched to the design load requirements of the wing section 50. The wing section 50 may include internal structure (not shown) for providing additional chord-wise or span-wise stiffness, as may be required for the particular application. As will be discussed below in more detail, the wing skins 58, 60 may be formed from any of various materials, including metals, composites and combinations thereof.

Figure 2:
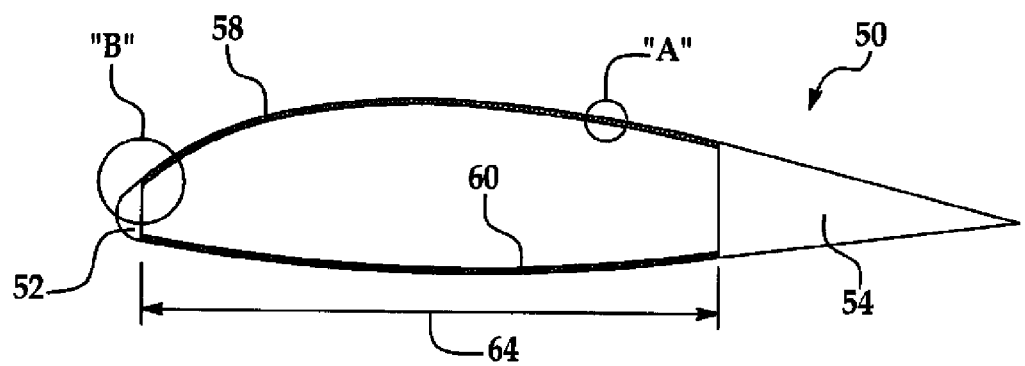
FIG. 2 is an end view of the wing section shown in FIG. 1.
Figure 3:
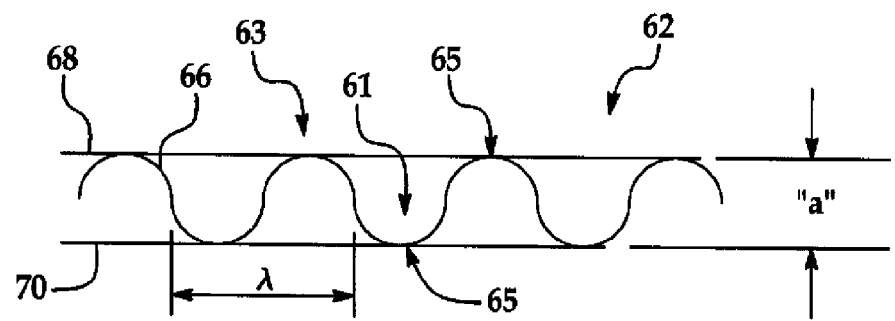
FIG. 3 is a cross sectional view of one of a portion of one of the panels forming the wing section shown in FIGS. 1 and 2.

As shown in FIG. 3, each of the panels 62 comprises a stiffener web 66 sandwiched between and joined to outer and inner facesheets 68, 70. The web 66 includes a fluted or corrugated-like, repeating pattern across the width of the panel 62, viewed from an end of the wing section 50, as shown in FIG. 2. For convenience of description, the web 66 may be referred to herein as a "corrugated web" or a web 66 having "corrugations" defined by a repeating pattern of grooves 61 and ridges 63. It is to be understood, however, that the repeating pattern of ridges 61 and grooves 63 need not be parallel to each other but rather, may tapered or angled with respect to each other along either the entire length of the web 66, or only a portion of the length of the web 66. Moreover, the repeating pattern of the web 66 may have one or more characteristics or dimensions that may vary across the width or cross section of the web 66, and these varying characteristics or dimensions may also vary along the entire length of the web 66 or along only a portion of the length of the web 66.

In the embodiment illustrated in FIGS. 1-6, the cross sectional shape of the corrugated web 66 is an undulating sine wave, however as will be discussed below, a variety of other cross sectional shapes are possible. The repeating pattern of the web 66 has a wavelength $\lambda$ and amplitude "a" which may be substantially equal to the spacing between facesheets 68, 70. The web 66 may be joined to the facesheets 68, 70 at alternating upper and lower contact points 65 using any of various techniques discussed below.

Figure 4:
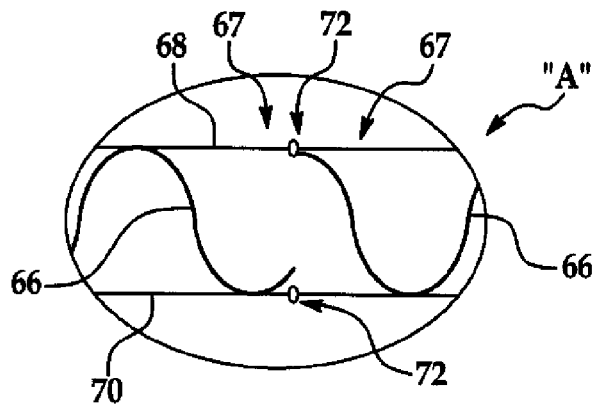
FIG. 4 is an enlarged view of the area designated as "A" shown in FIGS. 1 and 2.

FIG. 4 illustrates a typical joint between adjacent panels 62 in which adjacent edges 67 of facesheets 68, 70 are connected by welds 72. Depending on the materials from which the facesheets 68, 70 are fabricated, it may also be possible to bond the facesheets at the adjacent edges 67.

Figure 5:
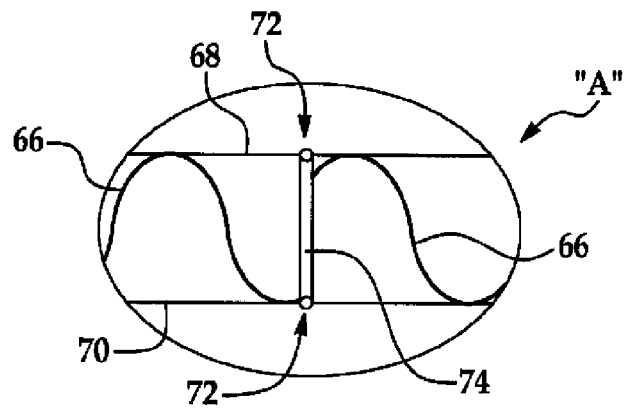
FIG. 5 is a view similar to FIG. 4 but showing an alternate embodiment of the skin.

FIG. 5 illustrates an alternate joint between adjacent panels 62 in which a web or wall 74 running substantially the entire length of the panel 62 is joined to each of the facesheets 68, 70 by welding or bonding. The wall 74, which extends traverse to the facesheets 68, 70 may comprise a discrete member, or may comprise a tab that is formed by bending an edge of either one of the facesheets 68, 70 on one of the panels 62. The wall 74 may be joined to each of the webs 66, if desired in order to increase the stiffness of the resulting joint.

Figure 6:
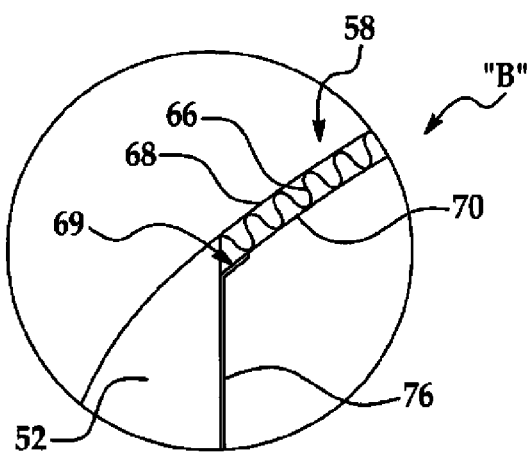
FIG. 6 is an enlarged view of the area designated as "B" in FIGS. 1 and 2.

FIG. 6 illustrates how a front spar 76 of the leading edge structure 52 may be integrated into the upper wing skin 58. A tab 69 forming part of the front spar 76 is angled so as to extend generally parallel to the contour of the skin 58 and may be joined to the lower facesheet 70.

As previously noted, the web 66 may possess any of a variety of repeating patterns across the width of each panel 62, and includes at least one dimension or geometric feature that varies substantially continuously along the length L of the panel 62 (FIG. 1) in order to provide substantially continuous varying stiffness that closely matches the profile of design load along the length L of wing section 50. Thus, as used herein, "repeating pattern" means a pattern which is generally repeating but with variations in one of more characteristics or dimensions of the pattern. FIGS. 7a and 7b illustrate a web 66a having a hat-shaped repeating pattern with a constant wavelength $\lambda$, while FIGS. 8a and 8b illustrate a web 66b illustrating a sine wave pattern. FIGS. 9a and 9b illustrate a web 66c having a square wave pattern while FIGS. 10a and 10b illustrate a web 66d having a sawtooth wave pattern. Finally, FIGS. 11a and 11b illustrate a web 66e having a repeating T-shape wave. While the wavelengths of the webs 66a-66e described above are constant, it is also possible to employ a wavelength $\lambda$ that varies along the length L of the wing section 50, as will be described below.

FIG. 12 illustrates an airplane 82 having wings 78 and horizontal stabilizers 84 employing a wing skin 58 exhibiting substantially continuous varying stiffness along its length. The wing 78 comprises leading and trailing edge structures 52, 54 and a wing tip structure 75, all joined to a series of wing skin panels 62 having substantially uniform width from the root 86 to the tip 88 of the wing 78. Thus, wing 78 possesses a substantially non-tapered wing skin 58. In contrast, as shown in FIG. 13, an airplane 82 includes wings 90 and horizontal stabilizers 92 that have a tapered wing skin 58a, resulting from the use of wedge shaped wing skin panels 62a that taper from the root 86 to the outer tip 88 of the wing 90.

Reference is now made to FIG. 14 which illustrates an alternate embodiment of the wing skin 58b formed of panels 62b having substantially uniform width, and a depth or thickness "t" that varies substantially continuously from the wing root 86 toward the wing tip 88. The cross section of the wing skin 58b adjacent the wing root 86 is indicated by the numeral 94, while the cross section at the wing tip 88 is designated by the numeral 96. As is evident from the cross sections 94, 96, the amplitude of the web 66, which in the illustrated example is a sine wave, decreases substantially continuously along the length of the wing skin 58b, from the root 86 to the tip 88.

FIG. 15 illustrates a wing skin 58c in which substantially continuous varying structural strength along the length of the wing skin 58c is achieved by varying the wavelength $\lambda$ of the sine wave pattern of the web 66 substantially continuously, from the wing root 86 toward the wing tip 88. In the illustrated example, greater structural strength at the wing root 86 is achieved by using a shorter wavelength web 66 while the web 66 near the wing tip 88 has a longer wavelength. This variation in wavelength $\lambda$ of the web 66 from the root 86 to the tip 88 results in wing skin panels 62c that are generally tapered, with the peaks of the web 66 being closer together at the wing root 86 than at the wing tip 88.

FIG. 16 illustrates a wing skin 58d that employs the techniques of the wing skins 58b, 58c respectively shown in FIGS. 14 and 15. Each of the wing skin panels 62d of the wing skin 58d employ a web 60 that varies substantially continuously both in the wavelength $\lambda$ and amplitude "a" (see FIG. 3) of the sine wave pattern from root 86 to tip 88. More specifically, the wavelength $\lambda$ increases from root 86 to tip 88, while the amplitude "a" decreases from root 86 to tip 88. Other geometric features or dimensions of the web 60 may be substantially continuously varied substantially continuously along the length of the wing skin 58 in order to provide a structural strength profile that closely matches the designed load profile of the wing. For example, the thickness of the material from which the web 60 is formed may be varied substantially continuously along the length of the wing skin 58. Also, the thickness of the facesheets 68 70, may be varied substantially continuously along the length of the wing skin 58, from root 86 to tip 88.

Figure 17:
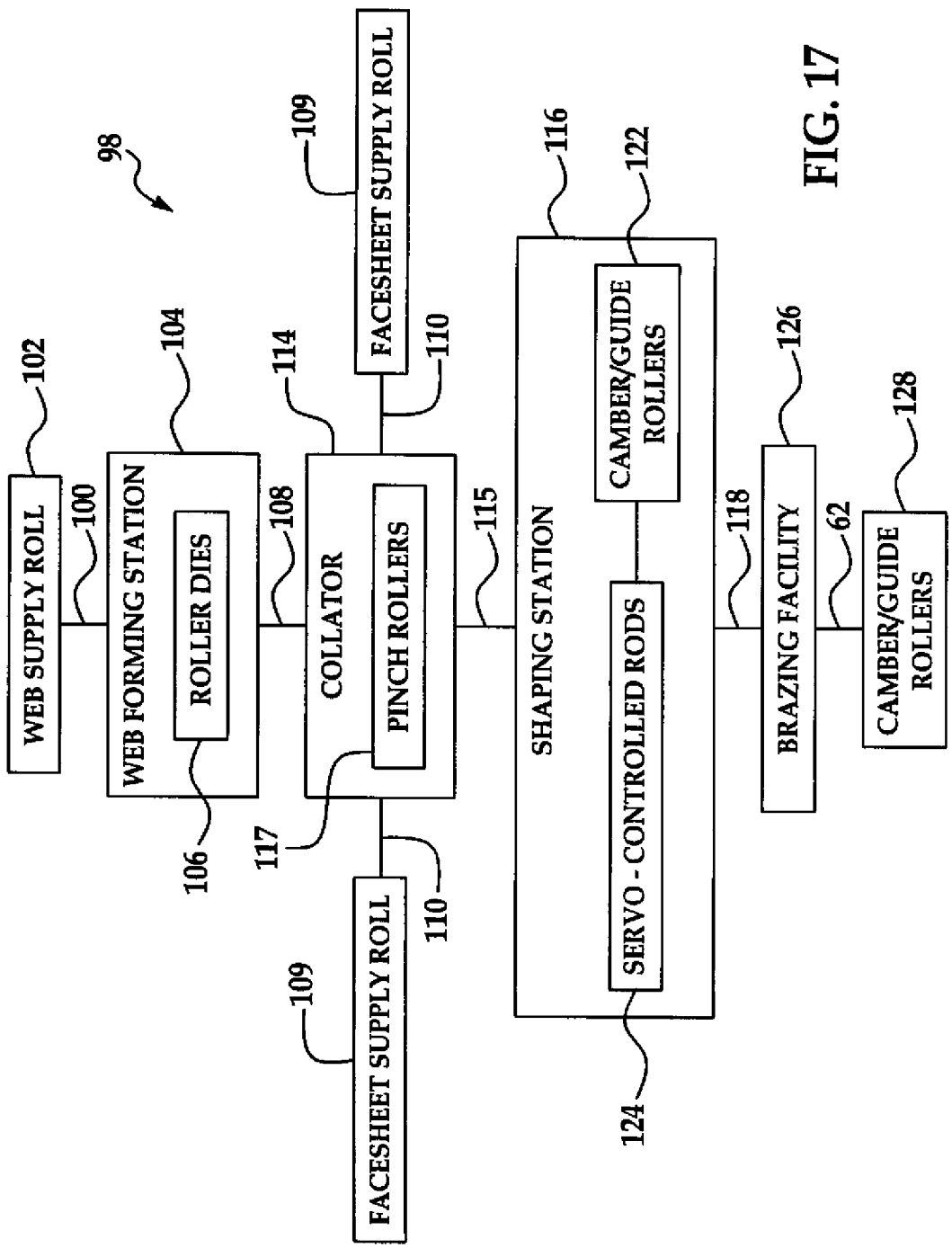
FIG. 17 is a functional block diagram of apparatus for forming the wing skin panels.
Figure 18:
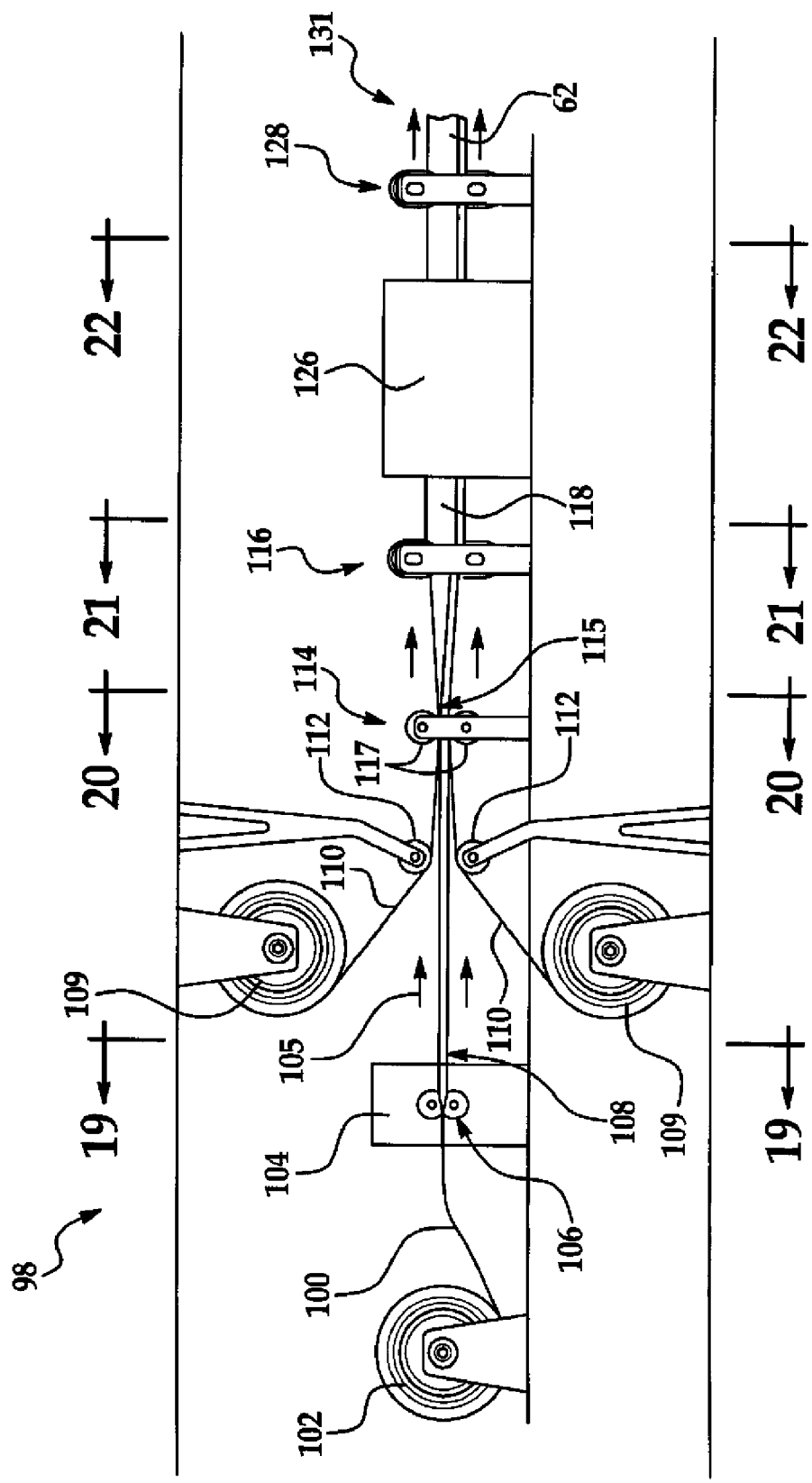
FIG. 18 is a side view illustrating a process and apparatus for forming the wing skin panels.
Figure 19:
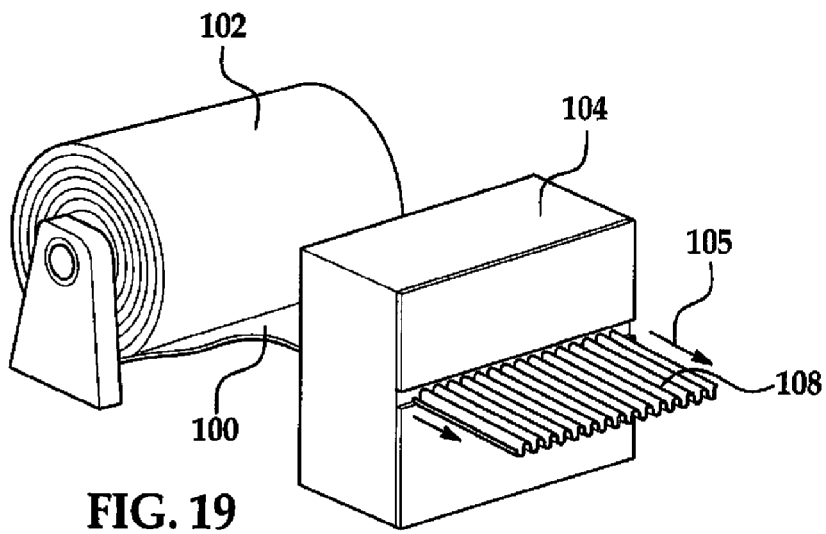
FIGS. 19-22 are perspective views details of the apparatus shown in FIG. 17.

The wing skin panels 62 described above may be fabricated using apparatus and a process generally indicated by the numeral 98 in FIGS. 17 and 18. Referring now to FIGS. 17-19, sheet material 100, which may comprise, for example and without limitation, metal, is drawn from a supply roll 102 and is passed through a web forming station 104 which may include roller dies 106 or similar tooling that squeezes and deforms the sheet material 100 so as to impart a repeating pattern to the sheet material 100. The repeating pattern matches the geometry of the roller dies 106 which can be varied so as to vary characteristics of the pattern, such as the wavelength $\lambda$ and the amplitude "a". The dimensions of the resulting web 66 are controlled by the web forming roller dies 106 which produce the variations in a substantially continuous, preprogrammed way, resulting in a load tailored core in a single step. Additional details of one suitable web forming station 104 are described in U.S. Pat. No. 6,834,525 issued Dec. 28, 2004. Details of another suitable web forming station 104 will be discussed below. The width and thickness of the sheet material 100 may be determined before processing is commenced, depending upon the requirements of the application. In some applications, the sheet material 100 may be preformed with varying thickness and/or width before being placed on the supply roll 102. For example, the metal sheet material 100 may be rolled or machined before it is passed through the forming station 104. In the case of skins formed composite materials, the web 66 may be simply molded to facesheets having a varying thickness.

Figure 20:
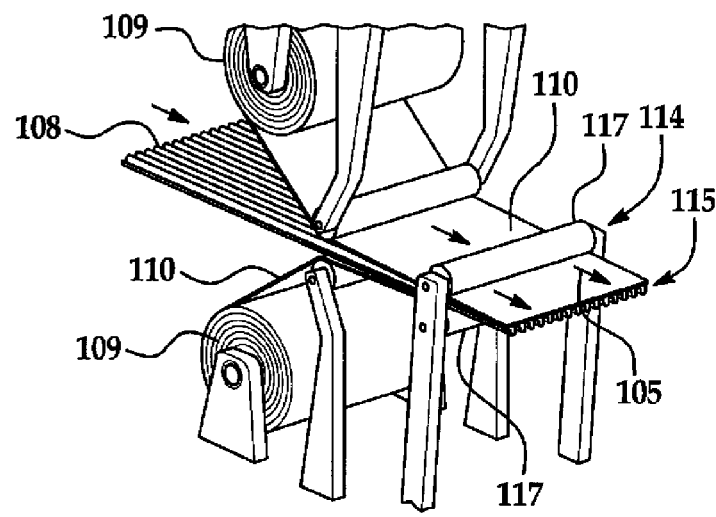
Figure 21:
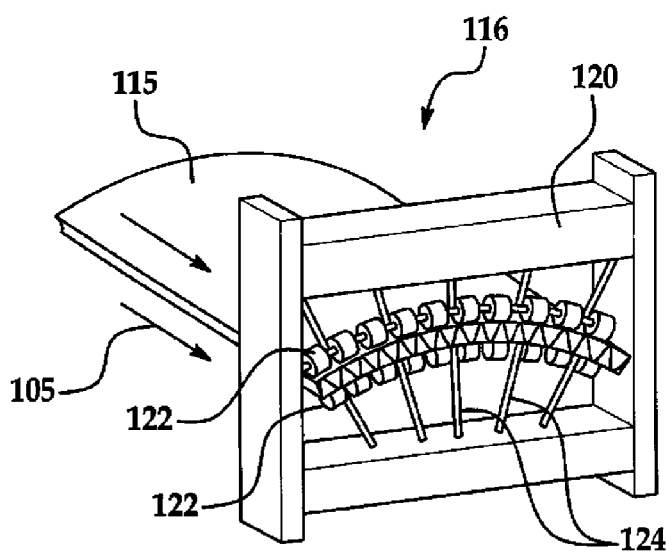

The formed web 108 moves from the forming station 104 in the direction of the arrows 105 to a collimator 114 shown in FIGS. 17, 18 and 20. As the continuous web 108 is fed to the collimator 114, facesheet material 110 drawn from supply rolls 109 is guided by rollers 112 onto the upper and lower surfaces of the continuous web 108. As shown in FIGS. 17, 18 and 20, the collimator 114 may comprise, for example and without limitation, a pair of pinch rollers 117 with included edge guides (not shown) which function to draw the two continuous lengths of facesheet material 110 and the formed web 108 into a sandwich 115 that emerges from the collimator 114 and is then drawn into a shaping station 116 shown in FIGS. 17, 18 and 21. The rollers and edge guides 117 ensure lateral alignment and keep the constant level of tension on the sheet material 100. The collimator 114 ensures that the facesheet material 110 and the web 108 are lined up with each other laterally.

The shaping station 116 may include shaping apparatus 120 comprising, for example and without limitation, two sets of camber and guide rollers 122 which are arranged to deform the continuous sandwich 115 into the desired cross sectional shape matching the desired surface profile of the wing. The cross sectional shape of the sandwich 115, and thus the surface contour of the resulting wing skin is determined by the position of the sets of the camber and guide rollers 122 which may be varied using servo-motor controlled rods 124 or other means for altering the configuration of the sets of rollers 122.

A digital controller (not shown) may be programmed to control the servo-control rods 124 and thus the position of the rollers 122. As the panel sandwich 122 moves through the shaping station 116, the contour imparted to the sandwich 122 may change, corresponding to the change in airfoil shape along the span of the wing, except in those applications employing constant chord wing designs. Shaping of the wing skin panels 62 to match local wing surface contours may eliminate or reduce the need for ribs and/or other support structure to maintain the shape of the wing. Moreover, fewer ribs may be required to support skin panels 62.

Figure 22:
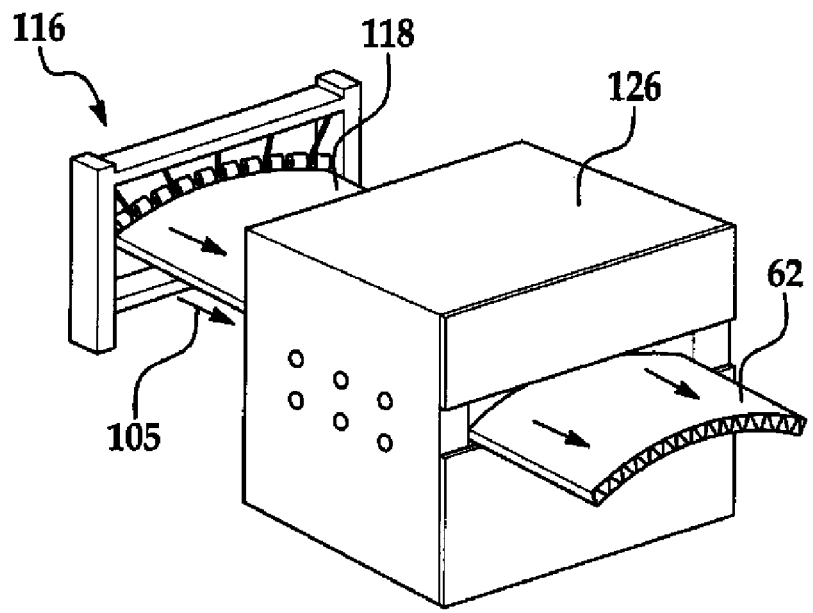

After passing through the shaping station 116, the shaped sandwich 118 is passed through a brazing facility 126, as shown in FIGS. 17, 18 and 22. The brazing facility 126 joins the web 66 to the facesheets 68, 70 by brazing, in the case of a metallic wing. Where the components of the skin panels are formed from composite material however, the components would be passed through a bonding facility (not shown), rather than the brazing facility 126. As shown in FIGS. 17 and 18, a second set of camber and guide rollers 128 may be employed to hold the shaped sandwich 118 while the brazed panel 62 is cooling. The finished wing skin panel 62 exits the apparatus 98 at 131 and may be cut to the desired shape or length using any suitable apparatus (not shown). From the foregoing, it may be appreciated that substantially continuous, near optimal variation in the amount of structural material may be used to complete the wing skins 58 in essentially a single manufacturing operation.

Figure 23:
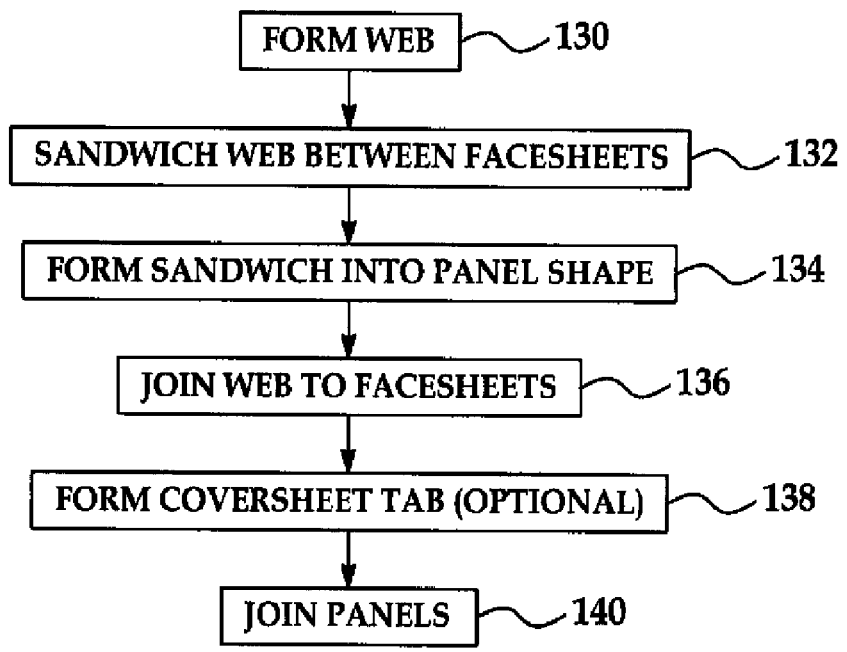
FIG. 23 is a flow diagram broadly illustrating the steps of a process for forming wings having substantially continuously varying structural strength.

Attention is now directed to FIG. 23 which illustrates, in simplified form, a process for fabricating wing skins having substantially continuously varying structural strength along their lengths. Beginning at 130, the web 66 is formed at a web forming station 104 (FIG. 17) or using other similar processes. Next, at 132, the web 66 is sandwiched between opposing facesheets 68, 70. The sandwich is then formed into the shape of the panel at 134 in order to achieve the desired surface contour of the skin. Then, at 136, the web 66 is joined to the facesheets 68 70. Optionally, tabs forming the wall shown in FIG. 5 may be formed on at least some of the panels as shown in step 138, following which the panels are joined together at step 140. The panels may be joined together using any of various known processes, such as, for example and without limitation, laser welding or friction stir welding.

As previously mentioned, the wing skin panels may be fabricated using composite materials. Where composite materials are used, a device (not shown) for forming the web 66 may incorporate, for example, the ability to partially cure composite core material immediately after it has been formed to the desired pitch amplitude and shape, using for example and without limitation, microwave curing. It may also be necessary or desirable to provide increased support for the shaped web during the cure stage to ensure the shape is maintained until the web is able to support itself without deformation. A suitable device (not shown) may be used to join the web to the facesheets, regardless of whether the facesheets are formed of metallic or composite materials. Such a device and related process may utilize a high strength paste adhesive and a spot or cure-on-demand curing process. Other techniques may be employed to join the web to the facesheets, depending on the materials from which they are formed, such as, without limitation, the use of selective blind fasteners and/or blind stitching. In the case of composite wing skin panels 62, the edges of the panels may be joined with adhesives using a cure-on-demand process.

Figure 24:
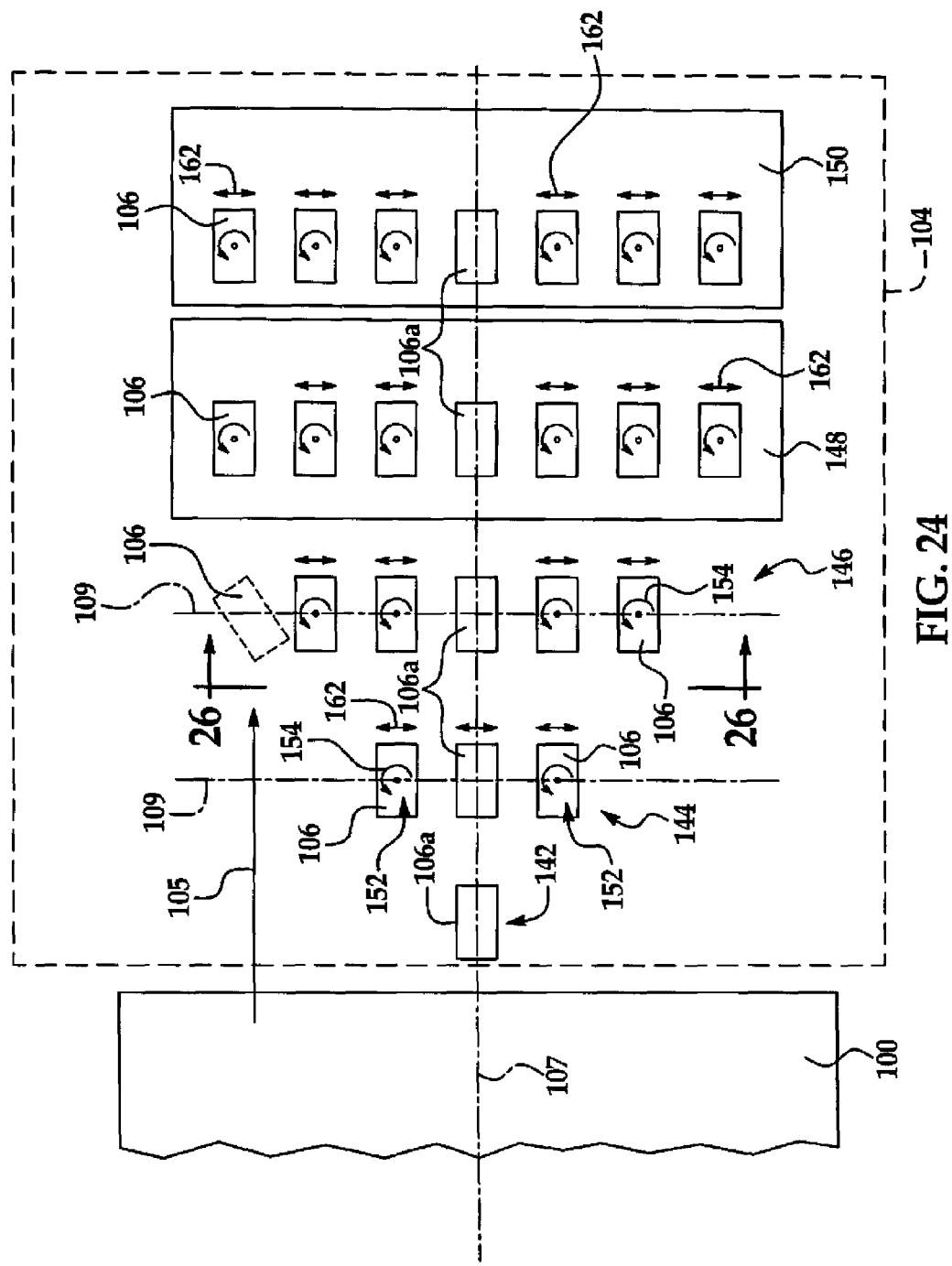
FIG. 24 is a top view diagram illustrating further details of the forming station shown in FIG. 19.
Figure 27:
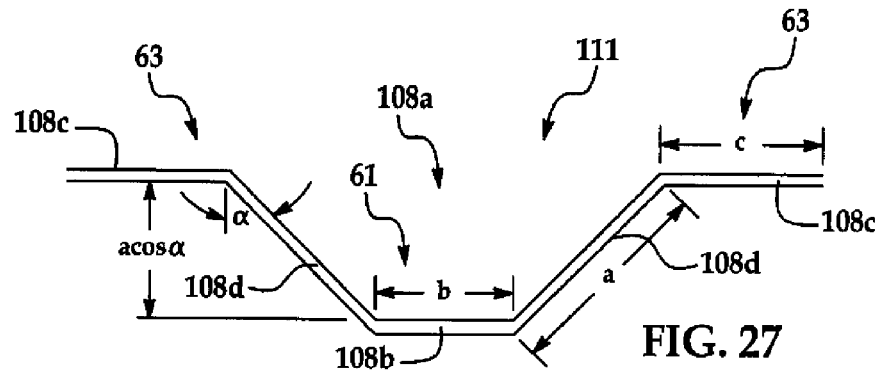
FIG. 27 is a cross sectional illustration of a portion of a web having hat-shaped corrugations.

Attention is now directed to FIG. 24 which illustrates the details of one embodiment of the web forming station 104 previously discussed in connection with FIGS. 18 and 19. For convenience of description, details of the web forming station 104 shown in FIG. 24 will be discussed in connection with the corrugated web 108a shown in FIG. 27 which has a hat-shaped cross section that includes alternating flat tops 108b, 108c connected by diagonal legs 108d. The arrangement of the alternating tops 108b, 108c and diagonal legs 108d effectively define alternating grooves 61 and ridges 63 which, as previously mentioned, may be collectively described as corrugations 111. The web forming station 104 may be employed to form a corrugated web 108 having any of a variety of other cross sectional shapes, including, but not limited to those illustrated in FIGS. 7a-11b. Also, the web forming station 104 may be employed to form corrugated webs 108 of any of a variety of metallic materials such as, without limitation, aluminum, titanium or steel, and thermoplastic materials, with or without reinforcement.

As shown in FIG. 24, the web forming station 104 broadly includes a plurality of die sets 142-150 spaced apart along, and symmetrically arranged with respect to, a centerline 107, which may comprise the centerline of the sheet 100. Each of the die sets 142-150 includes one or more die units 106 which are arranged along axes 109 that are substantially perpendicular to the central axis 107. As will be discussed below, certain features of the die units 106 determine the shape of the corrugations 111. Webs 108 having differing shapes of corrugations 111 may be formed by changing the die units 106 in each die set 142-150.

Each of the die sets 142-150 may include at least one die unit 106a that is substantially aligned with the centerline 107. The die sets 142-150 include progressively greater numbers of die units 106 from left to right as viewed in FIG. 24, in the direction of movement 105 of the sheet 100. The number of die sets 142-150 required for forming a particular web 108 will be equal to n–2, where n equals the number of shapes formed in the web 108. The forming changes in the web 108 produced by the die sets 142-150 are given by the formula:

$$FC = S_1 + \delta t_{1-2} S_2 + \delta t_{2\_} t_3 S_3 + \ldots \delta t_{(n-3)-(n-2)} S_{n-2}$$

where:
FC=Forming Changes
δ=Delta
T=Time (based on distance)

The full width of the sheet 100 is fed through the multiple die sets 142-150, such that the corrugations 111 are formed progressively, with each of the die sets 142-150 forming a portion of the total number of the corrugations 111. Formation of the corrugations 111 begins in the middle of the sheet 100, following which successive ones of the die sets 144-150 form corrugations 111 on opposite sides of the corrugations 111 previously formed in the middle of the sheet 100.

The corrugated web 108 formed by the forming station 104 may be of indefinite length and possesses a cross sectional shape having at least one characteristic that varies substantially continuously along the length of the web 108. In those applications where the web 108 is formed from a relatively heavy metallic material that may cause "spring-back" of the corrugation 111 if formed at room temperature, it may be necessary to heat the sheet 100 either before or while the sheet 100 is being formed. For example, induction heating stations (not shown) may be placed between the die sets 142-150 to facilitate hot sizing of the web 108.

At least certain of the die units 106 in each of the die sets 142-150 is laterally moveable, parallel to the axis 109, as indicated by the arrows 162. Additionally, at least certain of the die units 106 may also be partially rotatable along vertical axes 152, as shown at 154. As will be discussed later in more detail, as the sheet 100 moves through the web forming station 104, the die sets 142-150 progressively form corrugations 111 (FIG. 27) in the sheet 100, and these corrugations 111 may taper relative to the central axis 107 as a result of the simultaneous lateral movement and rotation of certain of the die units 106.

Figure 25:
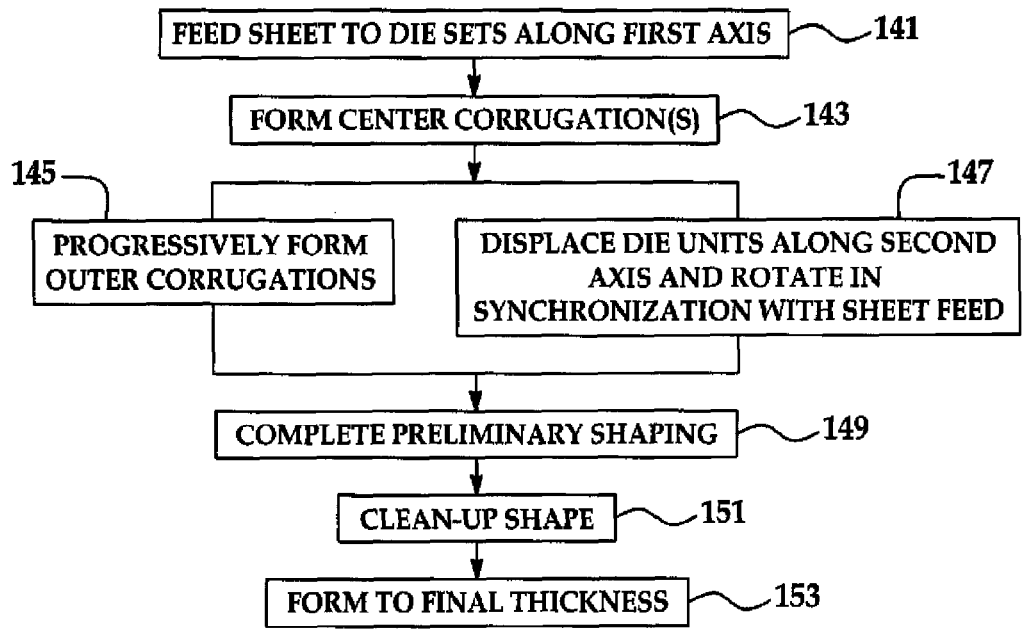
FIG. 25 is a flow diagram broadly illustrating the steps of a method for forming a corrugated web having a cross sectional that varies continuously along its length.

FIG. 25 broadly illustrates the steps of a method for forming a corrugated web 108a using the forming station 104 shown in FIG. 24. Beginning at 141, the sheet 100 is fed to the die sets 142-150. As the sheet moves through the die sets 142-150, one or more center corrugations 111 are formed by one or more die units 106a, as shown at step 143. At step 145, outer corrugations 111, on opposite sides of the center corrugations 111, are progressively formed as the sheet 100 moves through successive ones of the die sets 142-150. In an embodiment in which some of the corrugations 111 may be tapered, some of the die units 106 may be simultaneously laterally displaced and rotated, in synchronization with the movement of the sheet 100. Preliminary shaping of the corrugations 111 is completed at 149 following which the shape of the corrugations 111 may be refined or "cleaned up" at 151. Finally, at step 153, the web 108 is formed to a final thickness.

Figure 26:
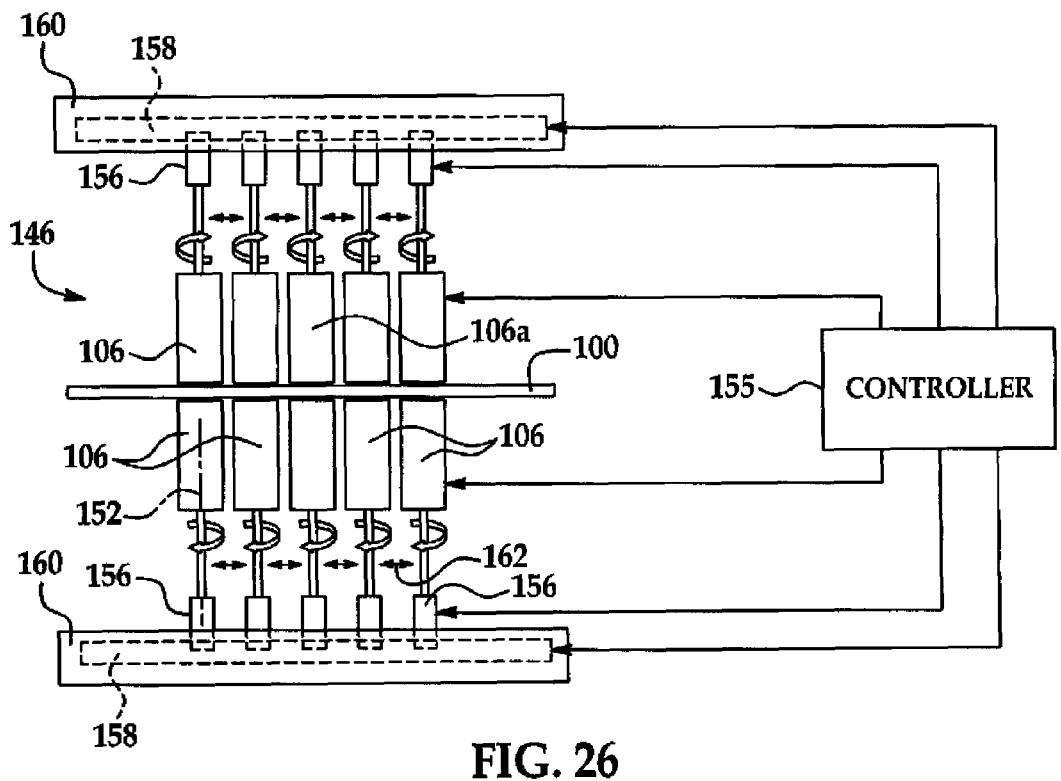
FIG. 26 is a combined block and schematic diagram illustrating a single die set and related controller.

FIG. 26 illustrates additional details of one of the die sets 146 in which the operation of the die units 106 is controlled by a controller 155 that may comprise for example and without limitation, a PC (personal computer) or a programmable logic controller (PLC). Each of the die units 106 engages opposite sides of the sheet 100 to form a corrugation 111 (FIG. 27) in the sheet 100 as the sheet 100 moves through the die station 146. Each of the die units 106 is connected to a first mechanism 156 which may comprise, for example and without limitation, a rotary actuator, that rotates the die unit 106 about axis 152 which extends substantially normal to the plane of the sheet 100, and perpendicular to the direction of travel 105 (FIG. 24) of the sheet 100. The first mechanisms 156 are mounted on second mechanisms 158 supported on a base 160 for lateral movement along the axis 109 shown in FIG. 24. The mechanism 158 may comprise a slide arrangement or gear drive which smoothly moves and controls the spacing between the die units 106. Mechanisms 156 and 158 may be operated by the controller 155 which controls and synchronizes the rotation and lateral displacement of the die units 106 to produce a web 108 with a particular cross section shape. Additional functions of the die units 106, such as the amount of pressure applied to the sheet 100, may also be controlled by the controller 155.

Figure 28:
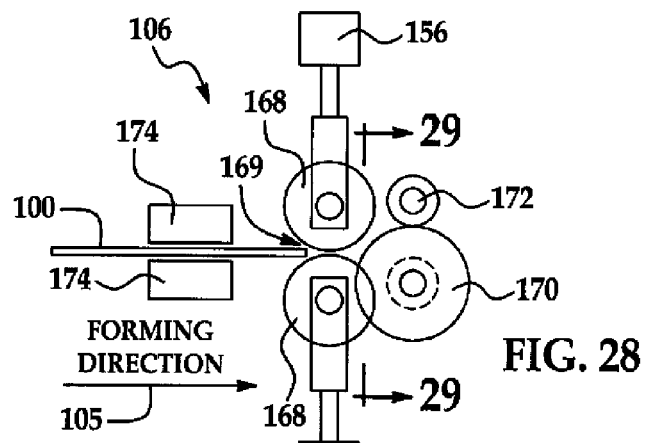
FIG. 28 is a side view illustrating a die unit forming part of the dies sets shown in FIG. 24.
Figure 29:
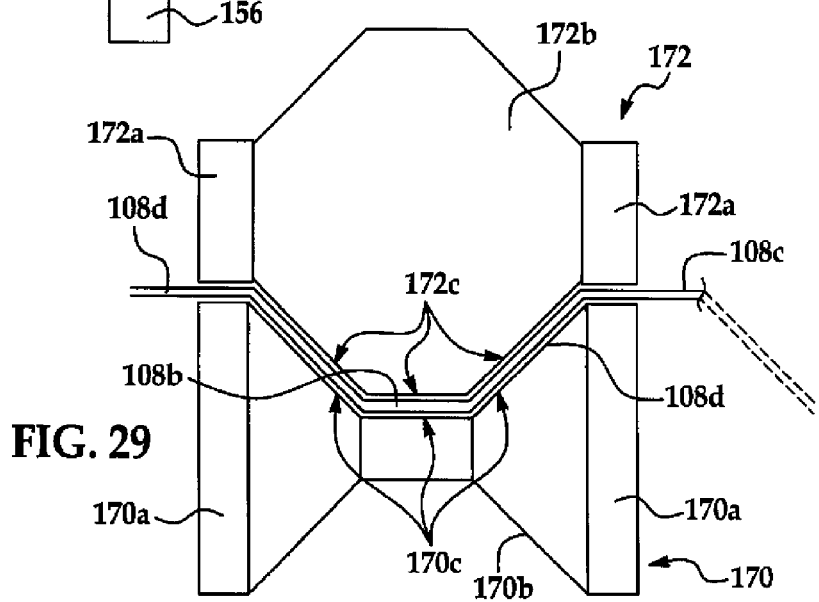
FIG. 29 is a sectional view taken along the line 29-29 in FIG. 28.

Attention is now directed to FIGS. 28 and 29 which depict further details of one of the die units 106 used in the die sets 142-146. The die unit 106 comprises a pair of driven pinch rollers 168 for engaging and moving the sheet 100 through a pair of matched roller dies 170, 172. One of the pinch rollers 168 and roller die 172 are mounted as a unit on an upper mechanism 156, previously described. Similarly, the second pinch roller 168 and roller die 170 are mounted as a unit on a lower mechanism 156. A slotted guide 174 may be provided for guiding the sheet 100 into the nip 169 of the pinch rollers 168. The upper roller die 172 includes outer cylindrical portions 172a that engage the flat tops 108c of the sheet 100, and a center portion 172b having outer forming surfaces 172c which function to form the top 108b and diagonal legs 108d of the corrugation 111.

The roller die 170 includes outer cylindrical surfaces 170a for engaging the tops 108c of the corrugation 111, and a center portion 170b. The center portion 170b is configured to include contiguous surfaces 170c which, in combination with surfaces 172c on the upper roller die 172, form the tops 108b and the diagonal legs 108d of the corrugation 111.

Figure 30:
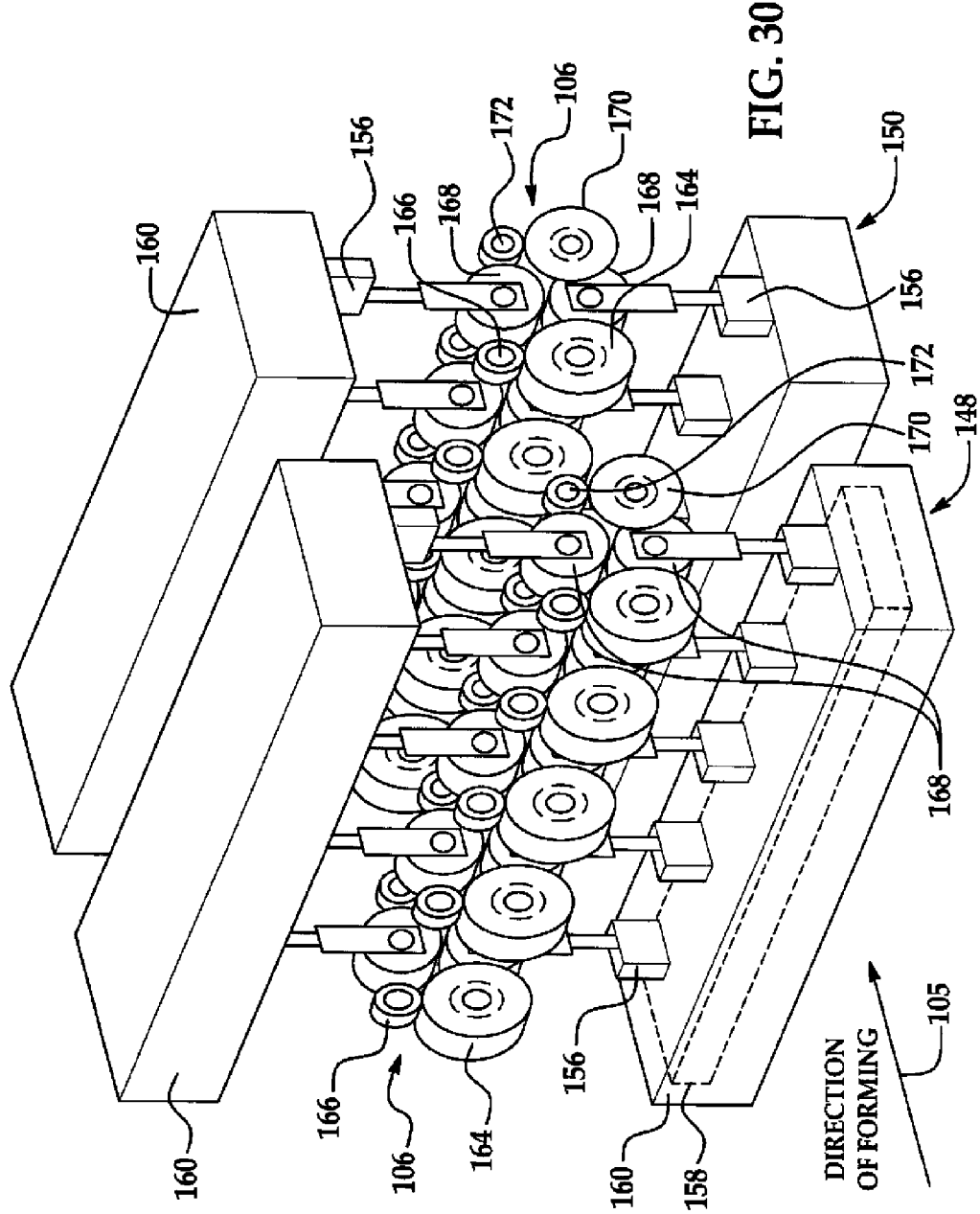
FIG. 30 is a perspective view of two of the die sets forming part of the forming station shown in FIG. 24.
Figure 31:
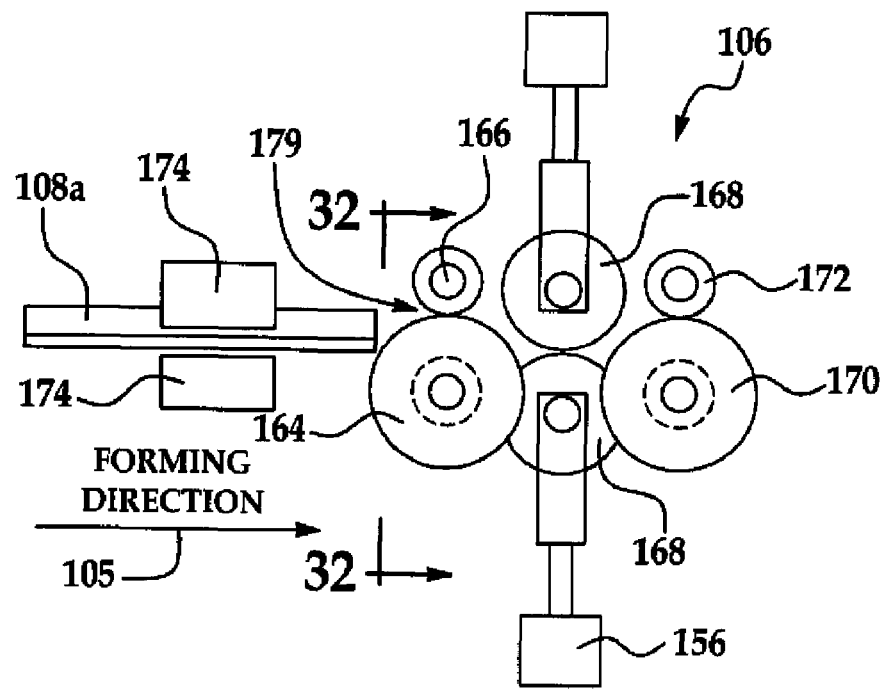
FIG. 31 is a side view of one of the die units in the die sets shown in FIG. 30.
Figure 32:
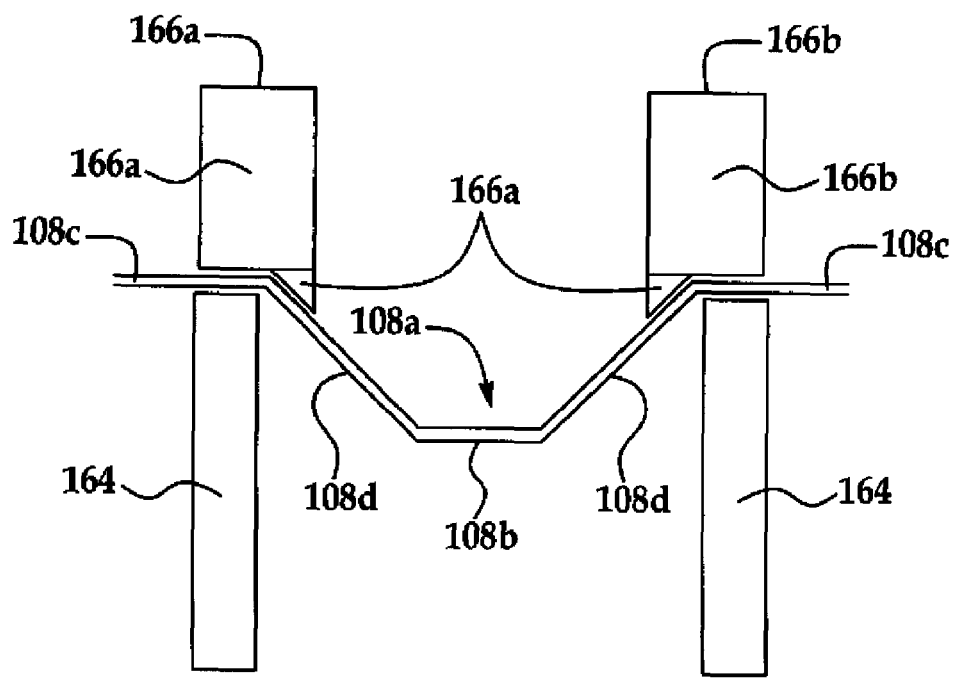
FIG. 32 is a sectional view taken along the line 32-32 in FIG. 31.

Reference is now made to FIGS. 30-32 which depict further details of the die sets 148, 150. As previously noted, die set 148 may function primarily to clean up and finalize the cross sectional shape of the web 108, while die set 150 may function to form the final thickness of the web 108. In other embodiments however, finalizing both the shape and the thickness of the web 108 may be jointly performed by the die sets 148, 150.

Each of the die sets 148, 150 include a first set of roller dies 164, 166 and a second set of roller dies 170, 172, similar to those previously described in connection with FIGS. 28 and 29. Further, a pair of pinch rollers 168 are disposed between the two sets of roller dies 164, 166 and 170, 172 which pull the partially formed web 108a through the die sets 148, 150.

As shown in FIG. 31, the partially formed web 108a passes through a guide 174 into the nip 179 between the roller dies 164, 166. Roller dies 164, 166 function to refine the shape of the partially formed web 108a. Roller dies 164 engage the lower face of the top 108c while roller dies 166 engage the upper face of the top 108c. The roller dies 166 may each include an angled portion 166a on the inner face thereof which functions to complete and/or clean up the transition between the diagonal leg 108d and the top 108c, as best seen in FIG. 32. In some applications, it may be desirable that the inboard portion 166a of the roller die 166 apply pressure to the web 108a, while the outboard portion 166b of the roller die 166 apply little or no pressure to the web 108a so that the material of the web 108a is allowed to deform or "squeeze" outwardly beneath the outboard portion 166b of the roller die 166.

Following the shaping operation on the partially formed web 108a performed by roller dies 164, 166, the web 108a passes through pinch rollers 168 which in turn feed the web 108a between a second pair of roller dies 170, 172 that may be similar in construction to those previously described in connection with FIGS. 28 and 29. As the web 108a passes between roller dies 170, 172, the pressure applied to the web 108a by the roller dies 170, 172 may be controlled to squeeze roller dies 170, 172 more tightly, and thereby determine the final thickness to which the web 108a is formed. Also, as previously described, in those applications where the thickness of the web 108a is to be tailored (continuously varied) along its length, the pressure applied by roller dies 170, 172 (and resulting material deformation) may be continuously varied in order to continuously change the thickness of the web 108a along its length.

Figure 33:
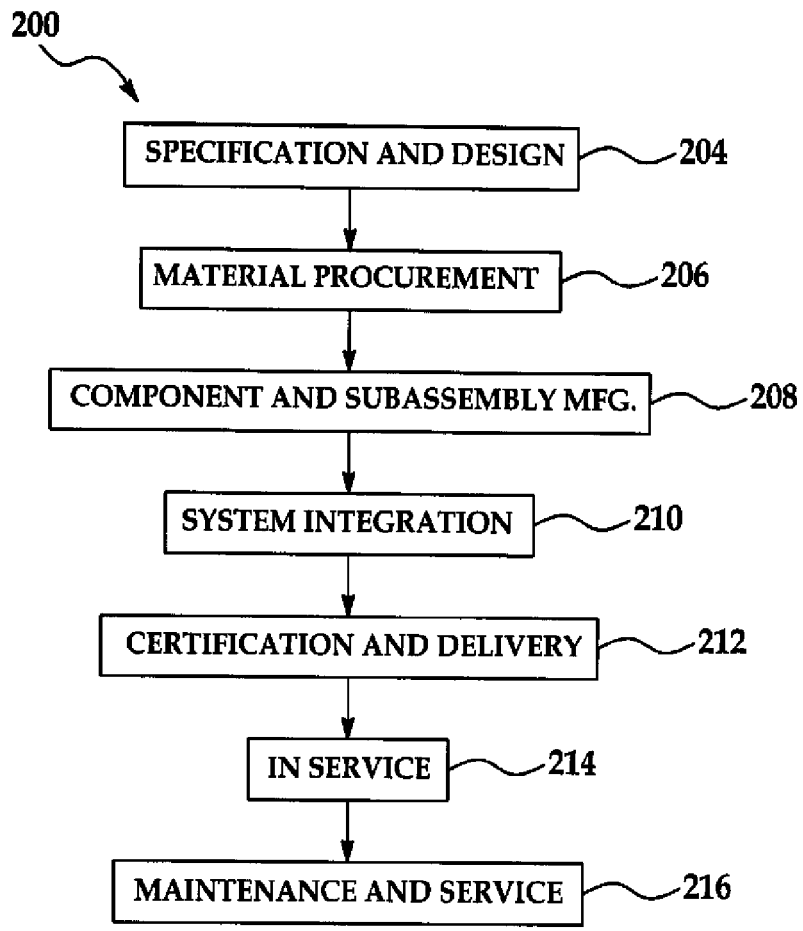
FIG. 33 is a flow diagram of aircraft production and service methodology.
Figure 34:
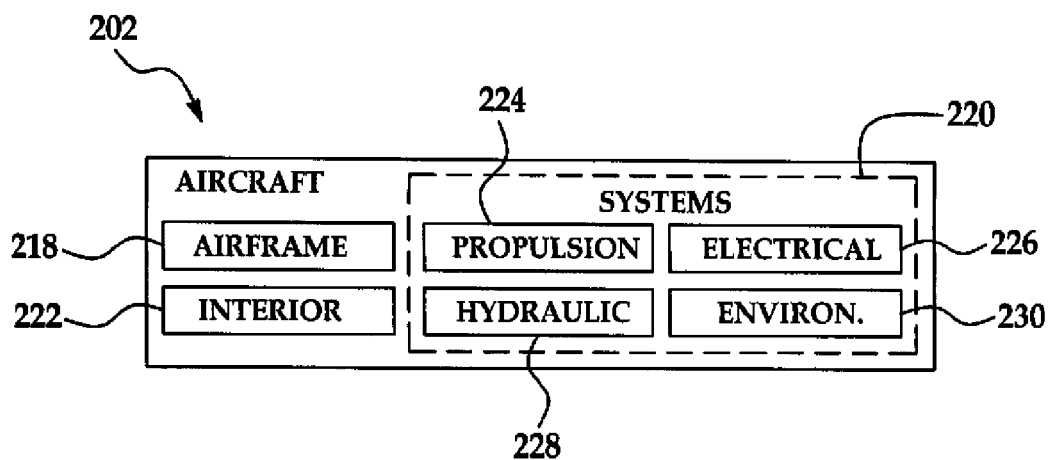
FIG. 34 is a block diagram of an aircraft.

Embodiments of the disclosure may find use in a variety of potential applications, particularly in the transportation industry, including for example, aerospace, marine and automotive applications. Thus, referring now to FIGS. 33 and 34, embodiments of the disclosure may be used in the context of an aircraft manufacturing and service method 200 as shown in FIG. 33 and an aircraft 202 as shown in FIG. 34. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 34, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the disclosure may be applied to other industries, such as the marine, automotive and construction industries.

Systems and methods embodied herein may be employed during any one or more of the stages of the production and service method 200. For example, components or subassemblies corresponding to production process 200 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Although the embodiments of this disclosure have been described with respect to certain exemplary embodiments, it is to be understood that the specific embodiments are for purposes of illustration and not limitation, as other variations will occur to those of skill in the art. For example, while the disclosed embodiments illustrate a wing, other structures forming part of an aircraft may advantageously employ the disclosed features, such as, for example and without limitation, fuselage sections, especially where the design load on the fuselage varies, as in tapered sections of the fuselage.

What is claimed is:

1. A method for forming a corrugated web, comprising:
    moving a sheet of material through a forming station;
    using multiple sets of dies at the forming station to progressively form corrugations in a machine direction of the sheet as the sheet moves in a machine direction through the forming station; and
    changing at least one characteristic of wavelength or amplitude of the cross sectional shape of the web by displacing at least certain of the dies as the sheet is moving through the forming station, wherein the characteristic varies continuously between a first position and a second position of the web, and wherein displacing at least certain of the dies includes moving the at least certain dies laterally away from the centerline of the sheet.

2. The method of claim 1, wherein progressively forming the corrugations includes:
    using a first set of the dies to form the general shape of the corrugations, and
    using a second set of the dies to form the final thickness of the corrugations.

3. The method of claim 1, wherein progressively forming the corrugations includes:
    forming corrugations in a central portion of the sheet, and, then forming corrugations in the sheet on opposite sides of the central portion.

4. The method of claim 1, wherein displacing at least certain of the dies includes rotating the at least certain dies as the dies are moving laterally away from the centerline of the sheet.

5. A corrugated web formed by the method of claim 1.

6. The method of claim 1 wherein the varied characteristic further comprises a wavelength or amplitude varying between a first position and a second position of the web.

7. The method of claim 1 further comprising attaching a first face sheet and a second face sheet to the web.

8. The method of claim 1 further comprising simultaneously moving sets of dies both in a lateral direction and in a rotational direction in order to continuously vary the characteristic of the web.

9. The method of claim 1 further comprising independently moving independent sets of pinch rollers both in a lateral direction and in a rotational direction in order to continuously vary the characteristic of the web.

10. The method of claim 1 wherein the dies comprise multiple sets of dies, each die having a width less than the width of the web.

11. A method for forming a corrugated web having a cross sectional shape with at least one characteristic that varies substantially continuously along the length of the web, comprising:
    moving a sheet of material along a first axis;
    forming a set of corrugations in the sheet as the sheet is moving along the first axis by passing the sheet through a set of dies, at least one die comprising a pinch roller having a first roller and a second roller; and,
    varying the characteristic of the cross sectional shape by displacing the dies along a second axis transverse to the first axis as the sheet moves through the set of dies; said step of displacing the dies moving the dies laterally away from the centerline of the sheet, and rotating the dies as the dies are moving laterally away from the centerline of the sheet, the varied characteristic comprising at least one of varying a wavelength or an amplitude in a web from a first position to a second position.

12. The method of claim 11, wherein forming the corrugations includes:
    forming corrugations in a center portion of the sheet, and then forming corrugations in outer portions of the sheet on opposite sides of the center portion.

13. The method of claim 11, wherein displacing the dies further includes synchronizing the rotation of the dies with the lateral movement of the dies.

14. A corrugated web formed by the method of claim 11.

15. The method of claim 11 further comprising attaching a first face sheet and a second face sheet to the web.

16. A method for forming a corrugated web used in an aircraft structure and having a cross sectional shape with at least one characteristic that varies substantially continuously along the length of the web, comprising:
    moving a sheet of material along a first axis through a forming station;
    using a first set of roller dies to form corrugations in a central portion of the sheet as the sheet moves through the forming station;
    after the corrugations have been formed in the central portion of the sheet, using a second set of dies to form corrugations in the sheet outside the central portions of the sheet;
    laterally displacing the second set of dies as the corrugations are being formed outside of the central portions of the sheet:
    rotating the dies in the second set as the dies in the second set are being laterally displaced;
    synchronizing the rotation of the dies in the second set with the displacement of the dies in the second set, including independently controlling a rotation and a lateral displacement of the dies in the second set of dies, and
    using a third set of dies to form the final thickness of the corrugations, wherein the characteristic that varies is selected from one of a wavelength or an amplitude of the web.

17. The method of claim 16 further comprising attaching a first face sheet and a second face sheet to the web.

* * * * *